June 7, 1966 A. J. M. HITCHCOCK 3,255,086
NUCLEAR REACTOR CONTROL SYSTEM
Filed Oct. 21, 1959 3 Sheets-Sheet 1
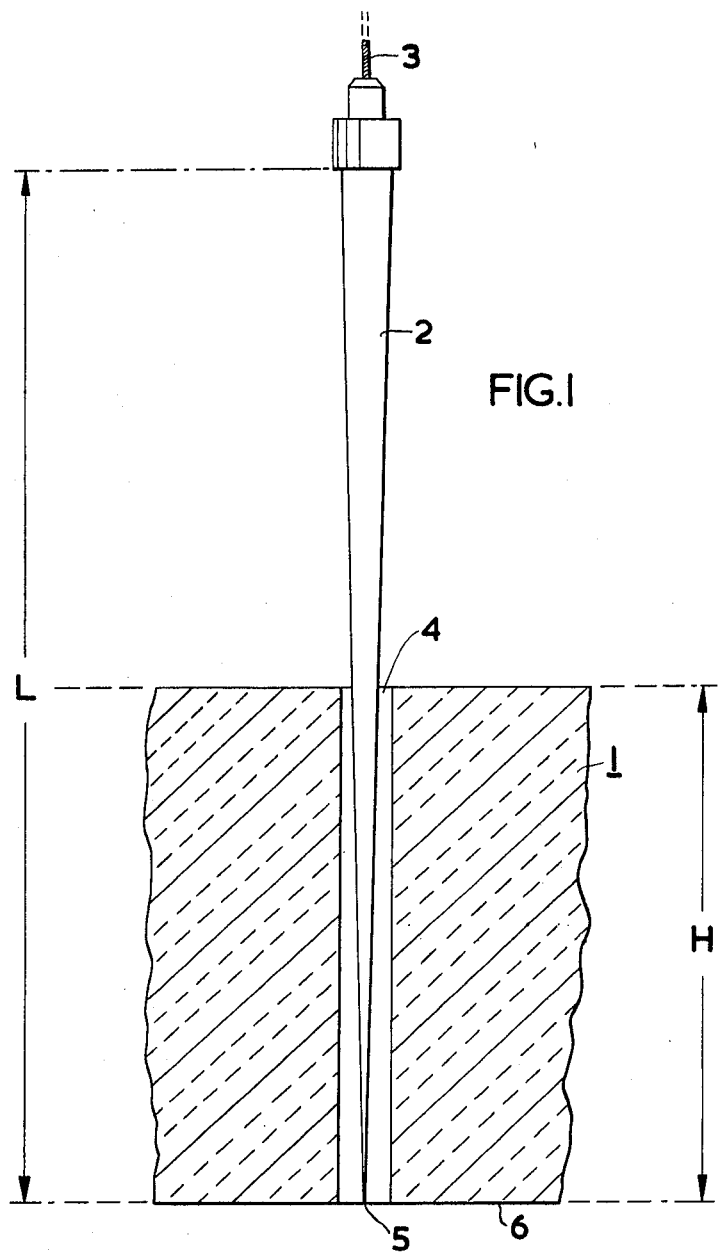
INVENTOR
ANTHONY JOHN MICHAEL HITCHCOCK
BY

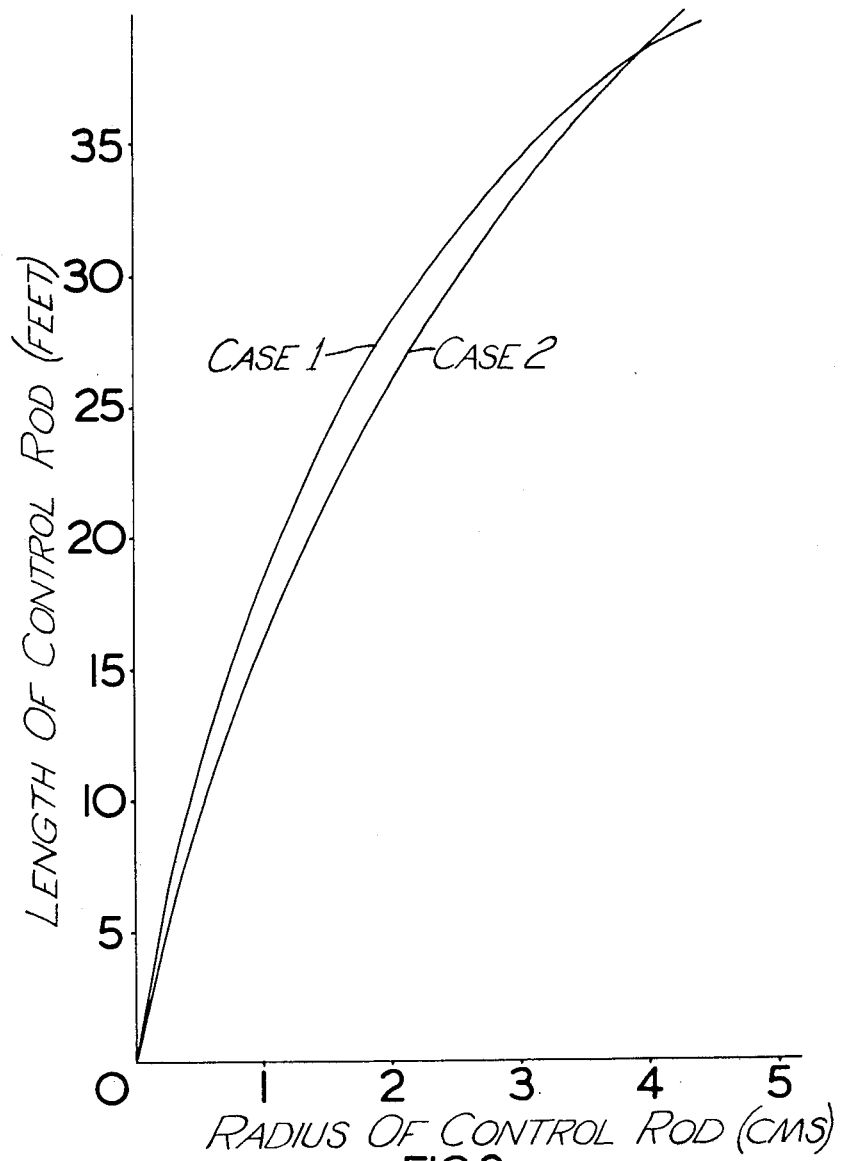

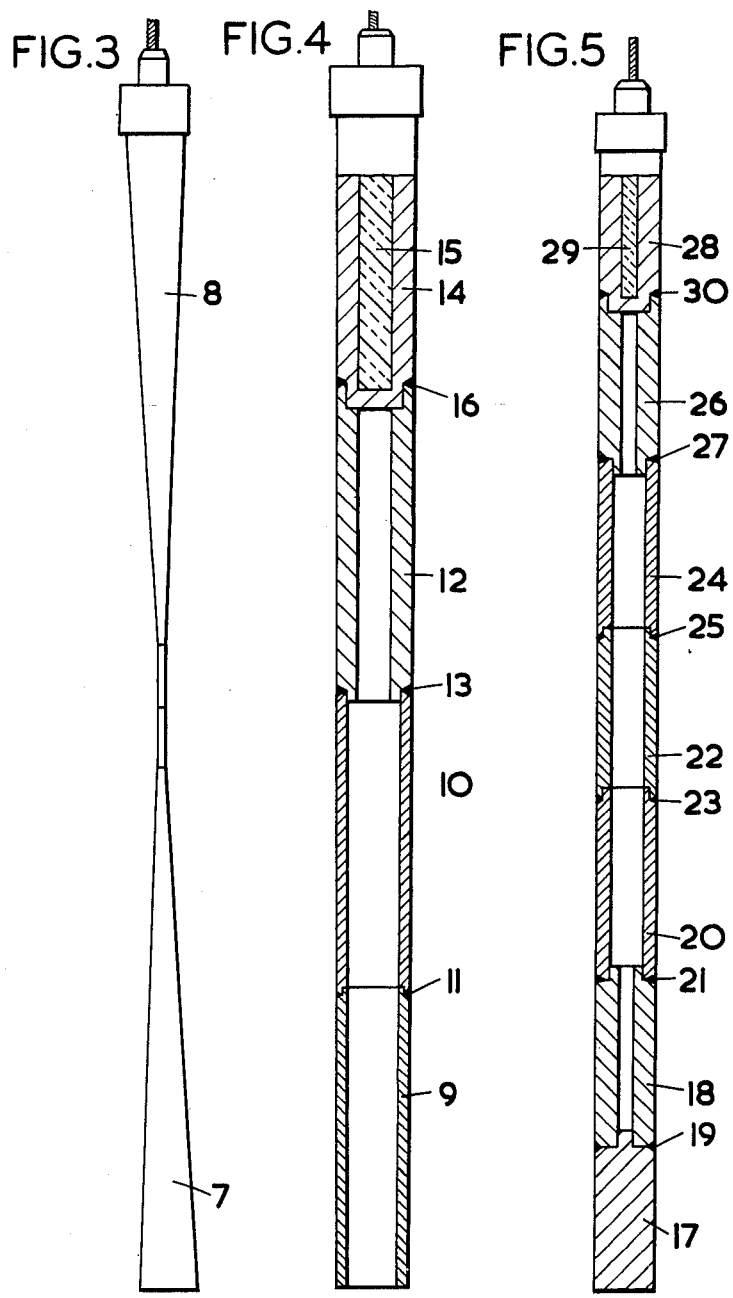

United States Patent Office 3,255,086
Patented June 7, 1966

3,255,086
NUCLEAR REACTOR CONTROL SYSTEM
Anthony John Michael Hitchcock, Lymm, England, assignor, by mesne assignments, to the United States of America as represented by the United States Atomic Energy Commission
Filed Oct. 21, 1959, Ser. No. 847,728
Claims priority, application Great Britain, Oct. 28, 1958, 34,413/58
2 Claims. (Cl. 176—35)

The invention relates to control rods for nuclear reactors and is particularly concerned with the control of reactivity in reactors of the type in which the nuclear process is a fission chain reaction produced by neutrons in an assembly of natural or slightly enriched uranium. In general such reactors comprise an assembly of fissionable material disposed in a core structure of moderating material such as graphite which slows neutrons to thermal energies at which they are most efficient to produce fission.

In nuclear reactors the ratio of the fast neutrons produced in one generation by fission to the original number of fast neutrons is a theoretical system of infinite size, where there can be no external loss of neutrons, is called the infinite reproduction or multiplication factor of the system and is usually denoted by the constant K. If K can be made sufficiently greater than unity to indicate a net gain of neutrons in a theoretical system of infinite size, a practical reactor can be sufficiently large so that this gain is not lost by leakage of neutrons from the periphery of the system. Thus a self sustaining chain reacting system of finite and practical size can be obtained. Control of reactivity in such a reactor can be effected in one way by insertion and withdrawal of control rods of neutron absorbing material into and out of the core structure, the rods having a neutron absorbing characteristic. Alternatively control rods containing fissile material can be withdrawn from and inserted into the core structure. The effect of each control rod on reactivity depends upon its degree of insertion into the core structure of the reactor. Since the axial flux distribution in the core structure is of smooth gradation with the control rods inserted there is a smooth gradation of reactivity with the control rods fully withdrawn. However with the control rods partially inserted into the core structure there is a stepwise change of reactivity between that part of the core structure containing the control rods and that part from which the control rods are withdrawn. This state of affairs may be unsatisfactory if instabilities are so provoked in the reactor.

According to the invention the nuclear reactor control rod is of graduated form so that movement of the control rod can take place without creating significant zones of stepwise change of reactivity in the nuclear reactor core structure. The term "graduated form" refers to the reactivity effect of the control rod.

The invention will now be described by way of example with reference to the accompanying drawings in which:

FIG. 1 is a longitudinal section of part of the core structure of a nuclear reactor.

FIG. 2 is a graph.

FIG. 3 is a elevation of a control rod in the form of a double cone.

FIG. 4 is a longitudinal sectional view of a composite form of control rod in accordance with the invention.

FIG. 5 is a longitudinal sectional view of a second embodiment of a composite form of control rod.

In FIG. 1 there is shown part of the core structure 1 of a nuclear reactor. A control rod 2 of neutron absorbing material and of physically tapered form is suspended from a cable 3 and is movable along a vertical control rod channel 4 in the core structure 1. The length L of the control rod 2 is twice the height H of the core structure so that when in the "fully out" position the point 5 of the control rod 2 is still at the bottom 6 of the core structure 1 as shown in FIG. 1. If it is acceptable to apply control over part of the reactor core structure only, partial insertion of the control rod 2 in the "fully out" position is acceptable and the control rod 2 can be of shorter length than shown in FIG. 1.

It can be shown mathematically that the ideal shape for a tapered control rod of the above form is approximately in accordance with the formula:

$$\frac{P}{a} + \frac{Q}{x} = \text{Constant}$$

where
 $a$ = control rod radius
 $x$ = distance along the rod measured from the pointed end
 P and Q are constants depending on the reactor design and the required control rod performance In accordance with the above formula the rod is approximately the shape obtained by rotating a rectangular hyperbola about a chord perpendicular to an assymptote. If while retaining other dimensions it is desired to alter the rate of control of reactivity per foot of insertion of the control rod it is merely necessary to alter the scale of $x$.

Calculations of control rod dimensions and shape have been made in two cases for a reactor having a core structure with the following parameters:

Core radius _____ cm__ 600
Core height _____ cm__ 600
Flattened radius _____ 0
$L_R^2$ (radial diffusion area) _____ cm.²__ 429
$L_{sR}^2$ (radial slowing down area) _____ cm.²__ 507
Control rod channel radius _____ cm__ 6

The results are tabulated below and shown graphically in FIG. 2.

CASE I.—FOR A SINGLE ROD AT THE CENTER OF THE CORE STRUCTURE AND INTENDED TO CONTROL 0.25% IN REACTIVITY PER FOOT INSERTION

| Distance along the rod (x) feet | 1.0 | 1.8 | 2.7 | 3.7 | 4.5 | 8.2 | 17.2 | 26.4 | 35.7 |
|---|---|---|---|---|---|---|---|---|---|
| Control rod radius $a$ cms | 0.032 | 0.066 | 0.102 | 0.139 | 0.177 | 0.343 | 0.885 | 1.73 | 3.23 |

CASE II.—FOR ONE OF A HUNDRED UNIFORMLY DISTRIBUTED RODS INTENDED TO CONTROL .0071% IN REACTIVITY PER FOOT INSERTION

| Distance along the rod (x) feet | 1.5 | 5.9 | 13.2 | 22.9 | 28.7 | 35 | 41.7 |
|---|---|---|---|---|---|---|---|
| Control rod radius $a$, cms | 0.074 | 0.312 | 0.777 | 1.62 | 2.19 | 3.27 | 4.76 |

As can be seen from FIG. 2 the calculated shapes in the two cases are very similar and this indicates that a sufficient approximation to the desired behaviour can be obtained with any number of rods of the same shape.

It is envisaged within the scope of the invention that the control rod can be wholly of fissible material. In this event for safety reasons it is preferably arranged that the rod is inserted into the core of the reactor point first from below the core so that the control rod can fall under gravity to reduce reactivity.

As shown in FIG. 3 the control rod can be in the form of a double cone having two conical parts 7 and 8 joined together at the points of the cones, the lower part 7 being made of fissile material and the upper part 8 being made of neutron absorbing material.

As shown in FIG. 4 the control rod can be of conventional cylindrical shape but having a reactivity effect of "graduated form" by virtue of being a composite construction. In the embodiment shown in FIG. 4 the control rod is made in four parts viz a lower part 9 in the form of a thin walled mild steel tube, a part 10 in the form of a thin walled boron steel tube joined end to end with the part 10 by a circumferential seam weld 11, a part 12 in the form of a thick walled boron steel tube joined end to end with the part 10 by a circumferential seam weld 13 and an upper part 14 in the form of a thick walled boron steel tube filled with borated graphite 15 and joined end to end with the part 12 by a circumferential seam weld 16.

In the embodiment shown in FIG. 5 the control rod is made in seven parts viz a lower solid part 17 made of fissile material, a part 18 in the form of a thick walled tube of fissile material joined end to end with the part 17 by a circumferential seam weld 19, a part 20 in the form of a thin walled tube of fissile material joined end to end with the part 18 by a circumferential seams weld 21, a part 22 in the form of a thin walled mild steel tube joined end to end with the part 20 by a circumferential seam weld 23, a part 24 in the form of thin walled boron steel tube joined end to end with the part 22 by a circumferential seam weld 25, a part 26 in the form of a thick walled boron steel tube joined end to end with the part 24 by a circumferential seam weld 27 and an upper part 28 in the form of a thick walled boron steel tube filled with borated graphite 29 and joined end to end with the part 26 by a circumferential seam weld 30.

I claim:

1. In a nuclear reactor, the combination of a nuclear reactor core structure having a channel therethrough and a control rod inserted from one end into the channel and extending movably within said channel to effect control of the nuclear reactor during operation thereof, the control rod being constructed of a plurality of parts joined end to end, the neutron absorbing capacity of the parts increasing from one part to the next in passing along the control rod from the end of the control rod at which the control rod is inserted into the channel, the said parts in their order of increasing capacity comprising a thin-walled mild steel tube, a thin-walled boron steel tube, a thick-walled boron steel tube, and a thick-walled boron steel tube filled with borated graphite.

2. In a nuclear reactor, the combination of a nuclear reactor core structure having a channel therethrough and a control rod inserted from one end into the channel and extending movably within said channel to effect control of the nuclear reactor during operation thereof, the control rod being constructed of a plurality of parts joined end to end, the neutron absorbing capacity of the parts varying from one part to the next, the said parts in passing along the control rod from the end of the control rod at which the rod is inserted into the channel comprising a solid length of fissile material, a thick-walled tube of fissile material, a thin-walled tube of fissile material, a thin-walled tube of mild steel, a thin-walled tube of boron steel, a thick-walled tube of boron steel and a thick-walled tube of boron steel filled with borated graphite.

References Cited by the Examiner

UNITED STATES PATENTS

| 2,852,456 | 9/1958 | Wade | 176—18 |
| 2,898,281 | 8/1959 | Untermyer et al. | 176—34 |
| 2,900,316 | 8/1959 | Kaufman et al. | 176—34 |

FOREIGN PATENTS

| 216,195 | 7/1958 | Australia. |
| 821,931 | 10/1959 | Great Britain. |

LEON D. ROSDOL, *Primary Examiner.*

WILLIAM G. WILES, ROGER L. CAMPBELL, OSCAR R. VERTIZ, CARL D. QUARFORTH, *Examiners.*

A. T. DAVIS, J. F. DAVIS, M. R. DINNIN,
*Assistant Examiners.*